United States Patent
Johnson et al.

(10) Patent No.: US 7,281,130 B2
(45) Date of Patent: Oct. 9, 2007

(54) STORING AUTHENTICATION SEQUENCES FOR EXPEDITED LOGIN TO SECURE APPLICATIONS

(75) Inventors: Bruce L. Johnson, Eagle, ID (US); Bradley J. Anderson, Boise, ID (US); Leonard T. Schroath, Boise, ID (US); William I. Herrmann, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 10/630,997

(22) Filed: Jul. 30, 2003

(65) Prior Publication Data

US 2005/0038994 A1  Feb. 17, 2005

(51) Int. Cl.
*H04L 9/00* (2006.01)

(52) U.S. Cl. ............... 713/162; 726/3; 726/4; 726/5; 726/6; 726/7; 726/8; 713/150; 713/168; 713/182; 713/183; 709/225; 709/228; 709/229

(58) Field of Classification Search ........ 726/3–8; 713/183, 184, 150, 162, 168, 182; 709/225, 709/228, 229
See application file for complete search history.

(56) References Cited

U.S. PATENT DOCUMENTS

| | | | |
|---|---|---|---|
| 5,166,979 A * | 11/1992 | Takayama et al. ........... 726/19 |
| 5,892,828 A | 4/1999 | Perlman | |
| 6,119,121 A | 9/2000 | Zhu | |
| 6,182,229 B1 * | 1/2001 | Nielsen ........................ 726/8 |
| 6,338,138 B1 | 1/2002 | Raduchel et al. | |
| 6,360,326 B1 | 3/2002 | Hiles | |
| 6,374,359 B1 * | 4/2002 | Shrader et al. ............... 726/5 |
| 6,490,687 B1 | 12/2002 | Nagai | |
| 6,601,169 B2 * | 7/2003 | Wallace et al. ........... 713/151 |
| 6,920,560 B2 * | 7/2005 | Wallace, Jr. .............. 713/168 |
| 6,985,953 B1 * | 1/2006 | Sandhu et al. ............ 709/229 |
| 7,010,605 B1 * | 3/2006 | Dharmarajan ............. 709/227 |
| 7,065,503 B2 * | 6/2006 | Matsushima et al. ........ 705/51 |
| 2002/0122553 A1 * | 9/2002 | Kao et al. .................... 380/28 |

* cited by examiner

*Primary Examiner*—Kim Vu
*Assistant Examiner*—Beemnet W Dada (57) ABSTRACT

Various systems, methods, and programs are provided that facilitate access to a secure application. In one embodiment, a method is provided that includes encrypting at least one authentication sequence in a computer system using a network identifier as an encryption key, and storing the encrypted at least one authentication sequence in a memory accessible to the computer system. Next, the encrypted at least one authentication sequence is decrypted using a second network identifier as a decryption key, the second network identifier is procured after storing the encrypted at least one authentication sequence. Thereafter, an expedited login task is performed to access the application with the at least one authentication sequence if the decryption of the at least one authentication sequence is successful.

20 Claims, 4 Drawing Sheets

STORING AUTHENTICATION SEQUENCES FOR EXPEDITED LOGIN TO SECURE APPLICATIONS

BACKGROUND

To gain secure access to applications, networks, and the like, a user may often be prompted to enter a username and a password or other authentication information in a login process. In some situations, a user may be required to repeatedly login to an application or network multiple times such as might be the case after the occurrence of one or more inactivity timeouts in a computer system, etc. However, being required to enter a user password and other authentication information repeatedly when the computer is in a secure environment can be tedious and bothersome to users.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
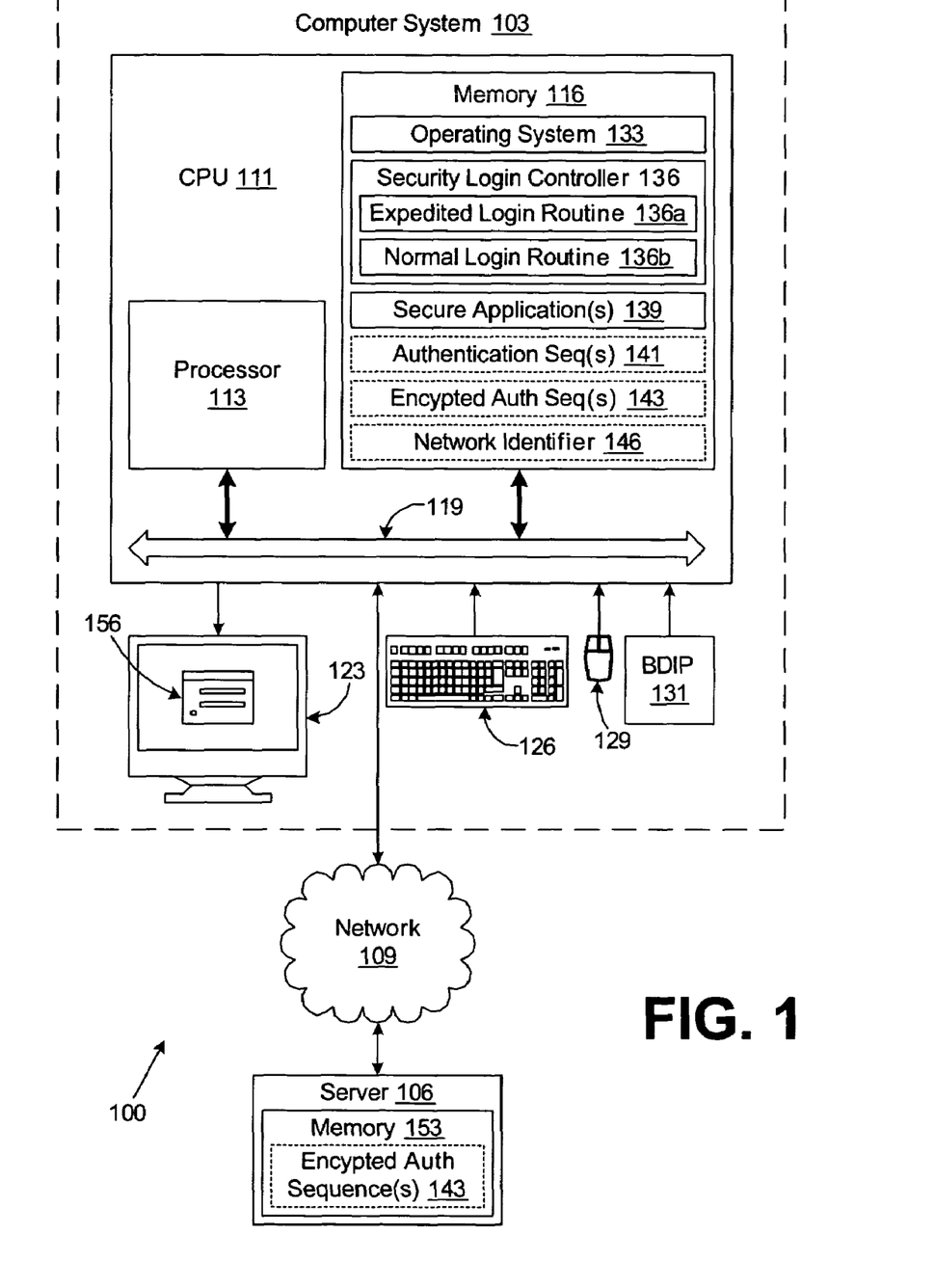
FIG. 1 is a block diagram of a network that includes at least one computer system and a server according to an embodiment of the present invention.

With reference to FIG. 1, shown is a data communications network 100 that includes, for example, a computer system 103 and a server 106, both of which are coupled to a network 109. In this respect, the network 109 may be, for example, the Internet, intranets, wide area networks (WANs), local area networks, wireless networks, or other suitable networks, etc., or any combination of two or more such networks. In addition, other computer systems 103, servers 106, or other devices may be coupled to the network 109.

The computer system 103 includes, for example, a central processing unit 111 that includes a processor circuit with a processor 113 and a memory 116, both of which are coupled to a local interface 119. The local interface 119 may be, for example, a data bus with an accompanying control/address bus as can be appreciated by those with ordinary skill in the art. The computer system 103 may also include various peripheral devices such as, for example, a display device 123, a keyboard 126, a mouse 129, and a biomedical data input device 131. The computer system 103 may also include other peripheral devices such as a keypad, touch pad, touch screen, microphone, scanner, joystick, or one or more push buttons, etc. The peripheral devices may also include indicator lights, speakers, printers, etc. The display device 123 may be, for example, a cathode ray tube (CRT), a liquid crystal display screen, gas plasma-based flat panel display, or other type of display device, etc.

The computer system 103 may be, for example, a desktop, a laptop, a palm or hand held computer such as a personal digital assistant, or any other device with like capability. The biomedical data input device 131 may be, for example, a fingerprint scanner, a retinal scanner, or other like devices.

Stored in the memory 116 and executable by the processor 113 are a number of software components including an operating system 133, a security login controller 136, and one or more secure applications 139. The security login controller 136 includes, for example, an expedited login routine 136a and a normal login routine 136b as will be described. As contemplated herein, the term "executable" means a program file that is in a form that can ultimately be run by the processor 113. Examples of executable programs may be, for example, a compiled program that can be translated into machine code in a format that can be loaded into a random access portion of the memory 116 and run by the processor 113, or source code that may be expressed in proper format such as object code that is capable of being loaded into a random access portion of the memory 116 and executed by the processor 113, etc. An executable program may be stored in any portion or component of the memory 116 including, for example, random access memory, read-only memory, a hard drive, compact disk (CD), floppy disk, or other memory components.

The security login controller 136, including the expedited login routine 136a and the normal login routine 136b may be implemented using any one of a number of programming languages such as, for example, C, C++, C#, Visual Basic, or other programming languages.

In addition, from time to time, one or more authentication sequences 141, one or more encrypted authentication sequences 143, and a network identifier 146 may be stored in the memory 116. The authentication sequences 141 are input to the CPU 111 by a user and may be encrypted, thereby creating the encrypted authentication sequence(s) 143. In addition, the network identifier 146 may be stored in an appropriate register coupled to the local interface 119 as will be described. The authentication sequences 141 and the corresponding encrypted authentication sequences 143 may comprise, for example, a password, username, biomedical identification data such as a fingerprint, retinal identification, DNA, or a combination of any two or more such authentication sequences that have been encrypted to prevent discovery should the computer system 103 be stolen, lost or otherwise compromised as will be discussed. The network identifier 146 may be, for example, an address of the computer system 103 such as an IP address associated with the network 109 to which the computer system 103 may be coupled. Alternatively, when the computer system 103 is not coupled to the network 109, the network identifier 146 may be a default value that is generated by a network card or other such device coupled to the local interface 119 in the computer system 103.

The security login controller 136 is executed by the processor 113 in order to provide secure access to one or more secure applications 139. In this respect, the security login controller 136 may generate a user interface 156, for example, on the display device 123 to facilitate a user login to a respective secure application 139 as will be discussed.

In addition, the server 106 of the data communications network 100 also includes a memory 153. The encrypted authentication sequence 143 may also be stored in the memory 153 of the server 106 in any memory that is accessible by the computer system 103. In this regard, the server 106 includes a processor circuit as can be appreciated by those with ordinary skill in the art. In addition, many other computer systems 103, servers 106, and other devices may be coupled to the network 109.

The memories 116 and 153 are defined herein as both volatile and nonvolatile memory and data storage components. Volatile components are those that do not retain data values upon loss of power. Nonvolatile components are those that retain data upon a loss of power. Thus, each of the memories 116 and 153 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be of electrical, optical, or molecular construction, or of some other construction as can be appreciated by those with ordinary skill in the art.

The operating system 133 is executed to control the allocation and usage of hardware resources such as the memory, processing time and peripheral devices in the computer system 103. In this manner, the operating system 133 serves as the foundation on which applications depend as is generally known by those with ordinary skill in the art.

Next, a general description of the operation of the security login controller 136 is provided in the context of the data communications network 100 according to an embodiment of the present invention. To begin, assume that a user causes the execution of one of the secure applications 139. The very first time that such an application 139 is executed, the user will have to login to such application 139 by inputting appropriate authentication sequences 141. As stated above, the authentication sequences 141 comprise a string of data associated with a user. Accordingly, such data may comprise, for example, a password, username, biomedical identification data such as a fingerprint, retinal identification, DNA, or any other authentication sequence, or a string of data that comprises a combination of any two or more such strings of data.

In order to facilitate the user login, the user interface 156 (FIG. 1) may be presented to the user that requests one or more authentication sequences 141. Also, the user interface 156 may prompt the user to provide appropriate biomedical authentication data using the biomedical data input device 131. The user interface 156 also provides for an input by the user that directs the security login controller 136 to save the inputted authentication sequences 141 for use with future logins at the same physical location or when the computer system 103 is coupled to the same network 109.

Next, assume that the user has entered or otherwise inputted the required authentication sequences 141 and that the user has indicated that the authentication sequences 141 are to be saved for future logins. In such case, the security login controller 136 proceeds to encrypt the one or more authentication sequences using the network identifier 146 as an encryption key. In this respect, if there are multiple authentication sequences that are input by a user, each may be combined together back to back or in some other manner before encryption. The network identifier 146 used as the key is a data sequence that is associated with a network coupling status of the computer system 103. The network coupling status of the computer system 103 describes the state of the computer system 103 as to whether it is coupled to or in close proximity to any one of a number of networks 109. In this respect, the network coupling status varies depending, for example, upon whether the computer system 103 is coupled to one of any number of networks 109. Also, the network coupling status may comprise the state of the computer system 103 when it is not coupled to any network 109.

Thus, the network identifier 146 may be a network address such as an Internet Protocol (IP) address that uniquely identifies a computer connected to the Internet to other computers for the purposes of communication through the transfer of data packets. Such an address may be obtained, for example, from a network interface that is employed to couple the local interface 119 with the network 109. Such a network interface may comprise, for example, an appropriate network card or other similar device. When coupled to a respective network 109, the network identifier 146 is assigned to the computer system 103 by a network device as can be appreciated by those with ordinary skill in the art. When the computer system 103 is not coupled to a network 109, the network identifier 146 may be a default value that indicates that the computer system 103 is not coupled to a network 109.

Assuming that the computer system 103 is coupled to a network 109, the specific network coupling status (i.e. which network the computer system 103 is coupled to) may be determined by examining data traffic in the network 109. The data traffic would include identifiers associated with other devices on the network 109 as well as other information associated with a respective network 109. Such information may be employed as a network identifier 146.

In still another alternative, the network coupling status may be ascertained by determining the physical proximity of the computer system 103 to a predefined network 109. In this respect, the physical position of the computer system 103 may be determined using a global positioning system (GPS) located in the computer system 103 or the physical location may be determined in some other manner. The physical location of the computer system may be compared with a predefined physical location of a respective network 109. When the computer system 103 is within a predefined distance from the network 109, it is assumed that the computer system 103 is coupled to the network 109. In such case, the network identifier 146 may be a physical location of the network 109. Alternatively, the network identifier 146 may be a physical location of the computer system 103 when in close proximity to the network 109, assuming that the computer system 103 will not be moved once the user logs in to the respective application 139.

The encryption algorithm that is employed to encrypt the authentication sequence 141 to generate the encrypted authentication sequence 143 may be any appropriate encryption algorithm as is known by those skilled in the art such as, for example, Data Encryption Standard (DES) or other encryption algorithm.

Once the authentication sequence(s) 141 are encrypted, they are stored in a memory such as memories 116 or 153 as the encrypted authentication sequence(s) 143. In any event, the memory within which the encrypted authentication sequence(s) 143 is stored is accessible to the computer system 103. The stored encrypted authentication sequence(s) 143 are to be employed to accomplish future logins in an expedited manner as will be discussed.

Assume next that the user is required to login to the secure application 139 at a time subsequent to the storage of the encrypted authentication sequence(s) 143. Such may be the case, for example, if the user has previously exited the secure application 139 and starts it up again, or if an inactivity timeout has occurred during the course of the execution of the secure application 139 while a user may be away from the computer system 103, etc. In such case, the security login controller 136 obtains a later version of the network identifier 146 acquired subsequent to the storage of the encrypted authentication sequence(s) 141. For example, the network identifier 146 may be obtained by reacquiring a current network address from a network card in the computer system 103 or through some other approach as described above. In this regard, the security login controller 136 may determine if the computer system 103 has been moved from the location from which the network identifier 146 was obtained to encrypt the authentication sequence(s) 141.

Thereafter, the security login controller 136 decrypts the encrypted authentication sequence 143 using the currently acquired network identifier as a decryption key. The security login controller 136 then determines if the decryption of the authentication sequence(s) 141 has been successful. This is determined by examining the decrypted authentication sequence(s) to determine if they are valid. Specifically, such information or a hash of such information may be compared to corresponding information or a corresponding hash stored in the computer system 103 or in the server 106. If the decrypted authentication sequence(s) are valid, then it can be assumed that the computer system 103 is located in the physical location or is coupled to the network 109 where a previous valid login took place.

If the decrypted authentication sequences are valid due to a successful decryption of the encrypted authentication sequence(s) 143, then the security login controller 136 performs a predefined expedited login task to access the secure application 139 using the authentication sequence(s) 141 that were decrypted. If the decryption was unsuccessful or fails, then the security login controller 136 deletes the encrypted authentication sequence(s) 143 from the respective memory.

The expedited login task performed upon a successful decryption of the encrypted authentication sequence(s) 143 may be, for example, executing an automated login to access the respective secure application 139 using the decrypted authentication sequence(s) 141 without further input by the user. In such case, the respective secure application is executed if the automated login was successful. Alternatively, the expedited login task may comprise presenting the user interface 156 to a user on the display device 123 with the decrypted authentication sequence(s) 141 inserted therein. In such a case, the user thus need not re-enter authentication sequence(s) 141 into the interface 156 as such information is automatically entered. Rather, the user need only initiate a login using the pre-entered authentication sequence(s) 141 by manipulating an "OK" button or by taking other similar action, etc. Thereafter, the respective secure application 139 is executed upon the occurrence of a successful login using the pre-entered authentication sequence(s) 141. In this manner, the user advantageously avoids the tedious re-entering of authentication information for repeated access to the same secure application even though the computer system 103 has not moved from the same position.

In addition, if an automated login fails or if a login using the pre-entered authentication sequence(s) 141 fails, the security login controller 136 then initiates a normal login process in which the user is required to enter all specified authentication sequences 141 to accomplish a normal login without any pre-entered authentication sequences 141.

By implementing the security login controller 136 as described above, a user may avoid the tedious process of performing repeated logins to obtain access to a secure application 139 in the computer system 103 even though the network coupling status of the computer system 103 may not have changed since a previous login was performed. However, if the network coupling status of the computer system 103 changes due to the fact that the computer system 103 was decoupled from a respective network 109, then the user is required to perform a new normal login when subsequently accessing one or more secure applications 139. This advantageously prevents an unauthorized user who may have stolen the computer system 103 from accessing the secure applications 139 therein without performing a full normal login, assuming that the network coupling status of the stolen computer system 103 changes due to the theft. Thus, the expedited login procedure is available only after an authorized user successfully performs a normal login to a secure application 139 and while the network coupling status remains unchanged. In addition, the security login controller 136 may include additional functionality than that detailed above as will be described. Also, the expedited login procedures described herein may be employed to provide secure access to any secure application 139 as well as to obtain access to secure networks as will be apparent to those with ordinary skill in the art.

Figure 2:
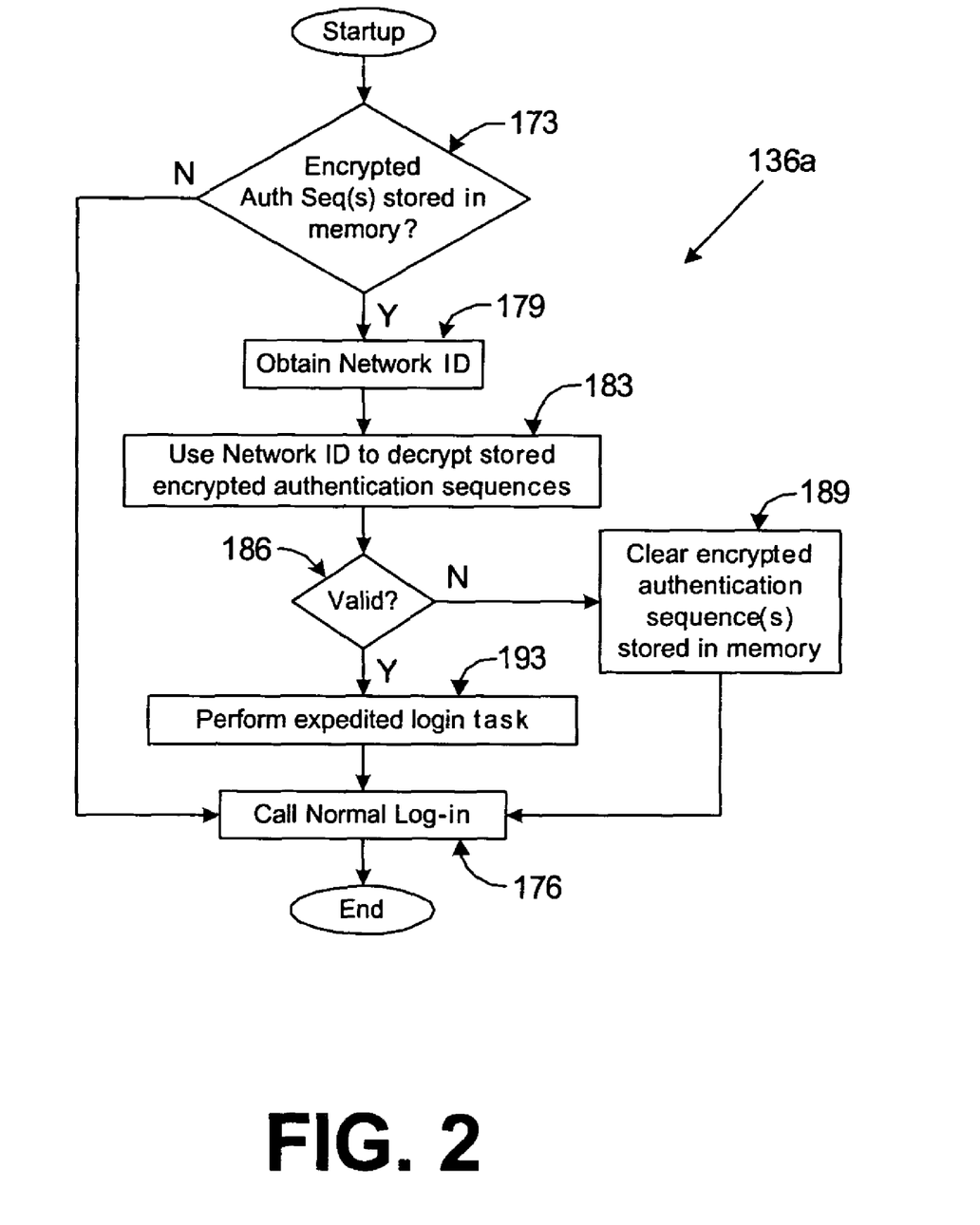
FIG. 2 is a flow chart of an expedited login routine that is a portion of a security login controller that is executed in the computer system in the network of FIG. 1 according to an embodiment of the present invention.

Referring next to FIG. 2, shown is a flow chart that provides one example of the operation of the expedited login routine 136*a* portion of the security login controller 136 according to an embodiment of the present invention. Alternatively, the flow chart of FIG. 2 may be viewed as depicting steps of an example of a method implemented in the computer system 100 to perform an expedited login to a secure application 139. The functionality of the expedited login routine 136*a* as depicted by the example flow chart of FIG. 2 may be implemented, for example, in an object oriented design or in some other programming architecture. Assuming the functionality is implemented in an object oriented design, then each block represents functionality that may be implemented in one or more methods that are encapsulated in one or more objects.

Beginning with box 173, the expedited login routine 136*a* determines whether an encrypted authentication sequence(s) 143 (FIG. 1) is/are stored in a predefined memory such as the memories 116 or 153 (FIG. 1). If not, then the expedited login routine 136*a* proceeds to box 176 in which a normal login portion of the expedited login routine 136*a* is called to perform a normal login as will be discussed. Otherwise, the expedited login routine 136*a* proceeds to box 179 in which a current version of the network identifier 146 is procured. Note that this version of the network identifier 146 is thus procured after the encrypted authentication sequence(s) 143 are stored in one of the memories 116 or 153 (FIG. 1).

In the case that the network identifier 146 is a network address such as an IP address, the network identifier 146 may be procured by reading an appropriate register or portion of memory in a network interface card that couples the computer system 103 (FIG. 1) to a network 109 (FIG. 1). Alternatively, the network identifier 146 may be a predefined physical position of the computer system 103 that is generated using a GPS system within the computer system 103 itself. Also, the network identifier 146 may be a predefined position of the network 109 stored in the memory 116 of the computer system 103 that is identified as the network identifier 146 by virtue of the physical proximity of computer system 103 thereto as determined by the physical position of the computer system 103 using a GPS system. In yet another alternative, the network identifier 146 may be an identifier unique to the respective network that is obtained from data traffic heard on such network 109.

Once the network identifier 146 is obtained, then in box 183, the network identifier 146 is employed as a key to decrypt the encrypted authentication sequence(s) 143. Thereafter, the expedited login routine 136*a* proceeds to box 186 to determine whether the decryption of the encrypted authentication sequences 143 was successful. This is ascertained by determining whether the authentication sequence(s) decrypted in box 183 are valid. Such a determination may be made by comparing such information or a hash of such information with information from a server coupled to the network 109 or with a stored hash of the valid information stored in the computer system 103.

If the decrypted authentication sequence(s) are deemed invalid in box 186, then the expedited login routine 136*a* proceeds to box 189. Otherwise, the expedited login routine 136*a* moves to box 193. In box 189, the encrypted authentication sequence(s) 143 are deleted or otherwise cleared from the respective memory 116 or 153. This is because an unsuccessful decryption of the encrypted authentication sequence(s) has taken place due to the network identifier has changed from when the authentication sequence(s) 141 were encrypted. In such case, the network coupling status has changed, thereby indicating that the computer system 103 has possibly been moved. Consequently, the encrypted authentication sequence(s) 141 are cleared or deleted to prevent such information from being successfully decrypted and falling into the hands of an unauthorized user. Thereafter, in box 176 the normal login routine 136*b* (FIG. 1) is called to perform a normal login procedure.

However, assuming that the decrypted authentication sequence(s) are deemed valid in box 186, then in box 193 the expedited login routine 136*a* implements any one of a number of expedited login tasks. In one embodiment, the expedited login task comprises entering or otherwise including the decrypted authentication sequence(s) 141 in the user interface 156 (FIG. 1) that is generated to be presented to a user to facilitate an expedited login to a respective secure application 139. Thereafter, the security login controller 136 proceeds to box 176 in which the normal login routine 136*b* of the security login controller 136 is called to perform a normal login as will be described.

Alternatively, in box 193, an automated login may be performed using the decrypted authentication sequence(s) 141 without presenting the user interface 156 to a user to obtain input from the user. If an automated login fails, then the normal login routine 136*b* is called to perform a normal login by the user. If the automated login is successful, then the expedited login routine 136*a* executes the desired secure application 139 rather than proceeding to call the normal login routine 136*b* as shown in box 176. Whether the normal login routine 136*b* is called in box 176 or the secure application 139 is executed after an automated login, the expedited login routine 136*a* ends.

Figure 3:
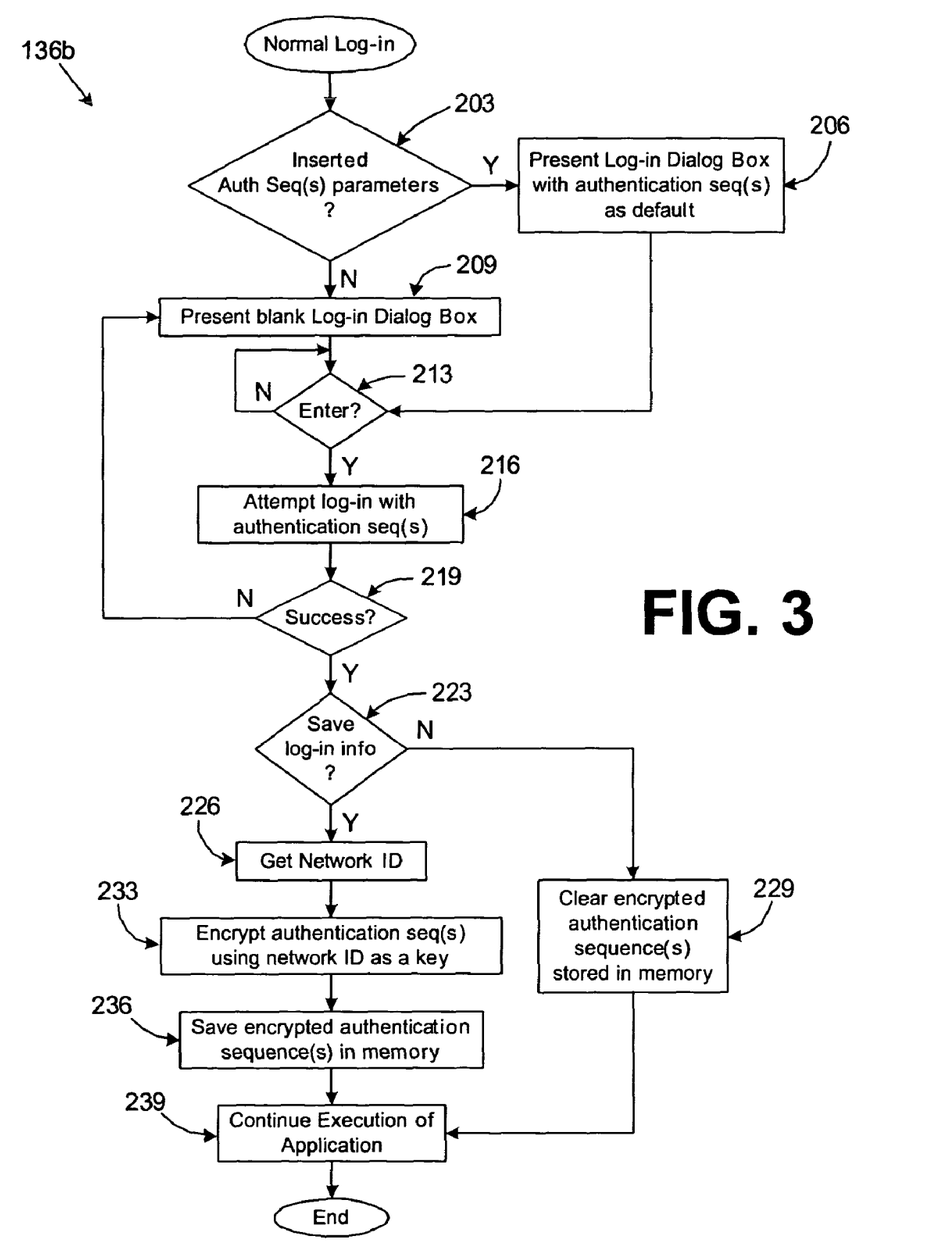
FIG. 3 is a flow chart of a normal login routine that is a second portion of the security login controller that is executed in the computer system in the network of FIG. 1 according to an embodiment of the present invention.

Referring next to FIG. 3, shown is a flow chart that provides one example of the operation of the normal login routine 136*b* of the security login controller 136 (FIG. 1) according to an embodiment of the present invention. Alternatively, the flow chart of FIG. 3 may be viewed as depicting steps of an example of a method implemented in the computer system 100 to implement a normal login to obtain access to a secure application 139 (FIG. 1). The functionality of the normal login routine 136*b* as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects.

Beginning with box 203, the normal login routine 136*b* determines whether the decrypted authentication sequence(s) 141 have been entered into the user interface 156 to be presented to the user. If so, then the normal login routine 136*b* proceeds to box 206. Otherwise, the normal login routine 136*b* progresses to box 209. In box 206, the user interface 156 is generated on the display device 123 (FIG. 1) in the form of a Login Dialog Box that includes the appropriate authentication sequences(s) 141 inserted therein. Thereafter, the normal login routine 136*b* proceeds to box 213.

Assuming that the normal login routine 136*b* has proceeded to box 209, then the user interface 156 is generated on the display device 123 in the form of the Login Dialog Box that is blank (i.e. without any inserted authentication sequence(s) 141 in the fields presented). Thereafter, the normal login routine 136*b* proceeds to box 213.

In box 213, the normal login routine 136*b* waits to receive an input from the user indicating that a login should be implemented with the authentication sequence(s) 141 entered or inserted in the appropriate fields of the user interface 156. This input may be, for example, a user manipulation of an appropriate button in the user interface 156 or it may be a voice input, or other input received from the user. Assuming that the appropriate input is received, then the normal login routine 136*b* proceeds to box 216 in which a login is attempted using the authentication sequence(s) 141 entered or inserted into the appropriate fields of the user interface 156.

Then, in box 219, if the login attempt of box 216 was successful, the normal login routine 136*b* proceeds to box 223. Otherwise, the normal login routine 136*b* reverts back to box 209 to present the user interface 156 comprising, for example, the Login Dialog Box to provide the user with a subsequent attempt to login to the secure application 139 (FIG. 1) by entering the required authentication sequence(s) 141.

Assuming the normal login routine 136*b* has proceeded to box 223, then it is determined whether the authentication sequence(s) 141 used to successfully login to the secure application 139 should be saved to be used for future expedited logins as provided by the expedited login routine 136*a*. Such a determination may be made by examining the state of a "Save" component of the user interface 156 that is described with reference to FIG. 4. Alternatively, other user input may be facilitated by which this determination may be made. Assuming that the authentication sequence(s) 141 are to be saved as determined in box 223, then the normal login routine 136*b* proceeds to box 226. Otherwise, the normal login routine 136*b* moves to box 229. In box 226, the normal login routine 136b procures a current version of the network identifier 146 that is associated with the current network coupling status of the computer system 103 (FIG. 1). This is done in the same manner as was discussed with reference to box 179 (FIG. 2) of the expedited login routine 136a (FIG. 2). Thereafter, in box 233 the authentication sequence(s) 141 input or inserted in boxes 206 or 209 are encrypted using the network identifier 146 as an encryption key.

Then, in box 236, the encrypted authentication sequence(s) 143 is/are saved in a predefined memory 116/153 that is accessible by the computer system 103. Next, the normal login routine 136 proceeds with the execution of the secure application 139 identified by the user.

With reference back to box 229, if the authentication sequence(s) 141 is/are not to be saved as determined in box 223, then the normal login routine 136 deletes any encrypted authentication sequences 143 stored in the memory 116/153. Thereafter, the normal login routine 136 proceeds to box 239. After the secure application 139 is executed in box 239, the normal login routine 136 ends accordingly. Alternatively, rather than executing a secure application 139, access to a secure network 109 may be provided to the computer system 103.

Figure 4:
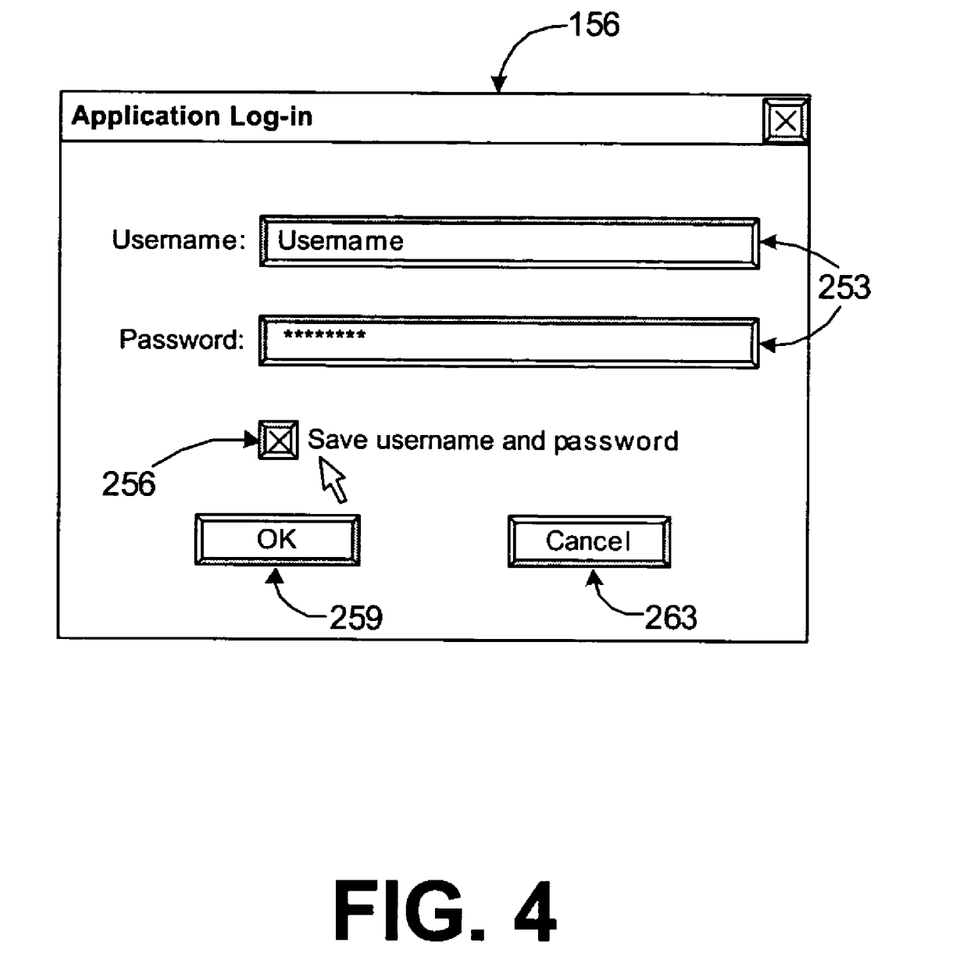
FIG. 4 is a drawing of a user interface generated by the security login controller that is executed in the computer system in the network of FIG. 1 according to an embodiment of the present invention.

Referring next to FIG. 4, shown is one example of the user interface 156 that may be displayed in the display device 123 (FIG. 1) according to an embodiment of the present invention. The user interface 156 comprises a Login Dialog Box that includes authentication sequence input fields 253, a "Save" component 256, an "OK" button 259, and a "Cancel" button 263. The authentication sequence input fields 253 facilitate the entry of authentication sequences 141. The "Save" component 256 comprises a toggle device that may be manipulated by the user to indicate whether a decrypted authentication sequence 141 is to be saved as determined in box 223 (FIG. 3). The "OK" button 259 may be manipulated by a user in order to trigger an attempt to login to a secure application 139 as described in box 213 (FIG. 3). Also, the user may manipulate the "Cancel" button if they wish to abort the attempt to access the secure application 139.

The inclusion of the "Save" component 256 thus provides the user with the opportunity to indicate where the user wishes that the authentication sequence(s) 141 entered are to be saved to facilitate future expedited logins to obtain access to secure applications 139 and the like. As a result, the user can control whether expedited logins are to be performed for future access to secure applications where the network coupling status has not changed. If the user is concerned that the computer system 103 may be accessed by unauthorized personnel while the current network coupling status is maintained in the future, the user may indicate that the authentication sequence(s) 141 are not to be encrypted and saved for future expedited logins.

With reference back to FIG. 1, although the security login controller 136 is embodied in software or code executed by general purpose hardware as discussed above, as an alternative the same may also be embodied in dedicated hardware or a combination of software/general purpose hardware and dedicated hardware. If embodied in dedicated hardware, the security login controller 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 2 and 3 show the architecture, functionality, and operation of one embodiment of an implementation of the security login controller 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the security login controller 136 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the security login controller 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

We claim:

1. A method for providing access to an application, comprising the steps of:
   procuring a first network identifier, the first network identifier being a network address that varies based upon a network coupling status of a computer system;
   encrypting at least one authentication sequence in the computer system using the first network identifier as an encryption key;
   storing the encrypted at least one authentication sequence in a memory accessible to the computer system;
   decrypting the encrypted at least one authentication sequence using a second network identifier as a decryption key, the second network identifier being produced after storing the encrypted at least one authentication sequence; and
   performing an expedited login task to access the application with the at least one authentication sequence if the decryption of the at least one authentication sequence is successful.

2. The method of claim 1, further comprising the step of deleting the encrypted at least one authentication sequence from the memory upon a failure to successfully decrypt the encrypted at least one authentication sequence using the second network identifier as a decryption key.

3. The method of claim 1, wherein the step of performing the expedited login task to access the application with the at least one authentication sequence further comprises the steps of:
   executing an automated login to access the application using the at least one authentication sequence; and
   executing the application if the automated login is successful.

4. The method of claim 1, wherein the step of performing the expedited login task to access the application with the at least one authentication sequence further comprises the steps of:
   presenting an application login interface to a user with the at least one authentication sequence inserted in the application login interface; and
   executing the application in the computer system upon a generation of an input associated with the application login interface.

5. A method for providing access to an application, comprising the steps of:
   procuring a first network identifier by examining an amount of data traffic on a network coupled to a computer system to obtain a network identification;
   encrypting at least one authentication sequence in the computer system using the first network identifier as an encryption key;
   storing the encrypted at least one authentication sequence in a memory accessible to the computer system;
   decrypting the encrypted at least one authentication sequence using a second network identifier as a decryption key, the second network identifier being procured after storing the encrypted at least one authentication sequence; and
   performing an expedited login task to access the application with the at least one authentication sequence if the decryption of the at least one authentication sequence is successful.

6. A method for providing access to an application, comprising the steps of:
   procuring a first network identifier by determining a physical proximity of a computer system to a location of a predefined network;
   encrypting at least one authentication sequence in the computer system using the first network identifier as an encryption key;
   storing the encrypted at least one authentication sequence in a memory accessible to the computer system;
   decrypting the encrypted at least one authentication sequence using a second network identifier as a decryption key, the second network identifier being procured after storing the encrypted at least one authentication sequence; and
   performing an expedited login task to access the application with the at least one authentication sequence if the decryption of the at least one authentication sequence is successful.

7. A program embodied in a computer readable medium for providing access to an application, comprising:
   code that procures a first network identifier associated with a network coupling status of a computer system;
   code that encrypts at least one authentication sequence using the first netwrok identifier as an encryption key;
   code that stores encrypted at least one authentication sequence in a memory;
   code that procures a second network identifier after storing the encrypted at least one authentication sequence;
   code that decrypts the encrypted at lest one authentication sequence using the second network identifier as a decryption key; and
   code that executes an expedited login task to access the application with the at least one authentication sequence if the decryption of the at least one authentication sequence is successful, wherein the code that procures the first network identifier associated with the network coupling status of the computer system further comprises code that procures a network address as the network identifier, wherein the network address varies based upon a network coupling status of the computer system.

8. The program embodied in the computer readable medium of claim 7, further comprising code that deletes the encrypted at least one authentication sequence from the memory upon a failure to successfully decrypt the encrypted at least one authentication sequence using the second network identifier as a decryption key.

9. The program embodied in the computer readable medium of claim 7, wherein the expedited login task to access the application with the at least one authentication sequence further comprises:
   code that performs an automated login to access the application using the at least one authentication sequence; and
   code that executes the application if the automated login is successful.

10. The program embodied in the computer readable medium of claim 7, wherein the expedited login task to access the application with the at least one authentication sequence further comprises:
    code that presents an application login interface to a user with the at least one authentication sequence inserted in the application login interface; and
    code that executes the application in the computer system upon a generation of an input associated with the application login interface.

11. A program embodied in a computer readable medium for providing access to an application, comprising:
    code that procures a first network identifier associated with a network coupling status of a computer system;

code that encrypts at least one authentication sequence using the first network identifier as an encryption key;

code that stores that encrypted at least one authentication sequence in a memory;

code that procures a second network identifier after storing the encrypted at least one authentication sequence;

code that decrypts the encrypted at least one authentication sequence using the second network identifier as a decryption key; and code that executes an expedited login task to access the application with the at leas tone authentication sequence if the decryption of the at least one authentication sequence is successful, wherein the code that procures the first network identifier associated with the network coupling status of the computer system further comprises code that procures the first network identifier by examining an amount of data traffic on a network coupled to the computer system to obtain a network identification.

12. A program embodied in a computer readable medium for providing access to an application, comprising:

code that procures a first network identifier associated with a network coupling status of a computer system;

code that encrypts at least one authentication sequence using the first network identifier as an encryption key;

code that stores the encrypted at least one authentication sequence in a memory;

code that procures a second network identifier after storing the encrypted at least one authentication sequence;

code that decrypts the encrypted at least one authentication sequence using the second network identifier as a decryption key; and code that executes login task to access the application with the at least one authentication sequence if the decryption of the at least one authentication sequence is successful, wherein the code that procures the first network identifier associated with the network coupling status of the computer system further comprises code that procures the first network identifier by determining a physical proximity of the computer system to a location of a predefined network.

13. A system for providing access to an application, comprising:

a processor circuit having a processor and a memory;

the application stored in the memory and executable by the processor;

a secure login controller stored in the memory and executable by the processor, the secure login controller further comprising;

logic that procures a first network identifier associated with a network coupling status of the processor circuit;

logic that encrypts at least one authentication sequence using the first network identifier as an encryption key;

logic that stores the encrypted at least one authentication sequence in the memory;

logic the procures a second network identifier after storing the encrypted at least one authentication sequence;

logic that decrypts the encrypted at least one authentication sequence using the second network identifier as a decryption key; and logic that executes an expedited login task to access the application with the at least one authentication sequence if the decryption of the at least one authentication sequence is successful, wherein the logic that procures the first network identifier associated with the network coupling status of the processor circuit further comprises logic that procures a network address as the network identifier, wherein the network address varies based upon whether the processor circuit is coupled to one of a number of predefined networks.

14. The system of claim 13, further comprising logic that deletes the encrypted at least one authentication sequence from the memory upon a failure to successfully decrypt the encrypted at least one authentication sequence using the second network identifier as a decryption key.

15. The system of claim 13, wherein the expedited login task to access the application with the at least one authentication sequence further comprises:

logic that performs an automated login to access the application using the at least one authentication sequence; and logic that executes the application if the automated login is successful.

16. The system of claim 13, wherein the expedited login task to access the application with the at least one authentication sequence further comprises:

logic that presents an application login interface to a user with the at least one authentication sequence inserted in the application login interface; and logic that executes the application in the computer system upon a generation of an input associated with the application login interface.

17. A system for providing access to an application, comprising:

a processor circuit having a processor and a memory;

the application stored in the memory and executable by the processor;

means for procuring a first network identifier associated with a network coupling status of a computer system, wherein the first network identifier is a network address that varies based upon a network coupling status of the computer system;

means for encrypting at least one authentication sequence using the first network identifier as an encryption key;

means for storing the encrypted at least one authentication sequence in the memory; means for procuring a second network identifier after storing the encrypted at least one authentication sequence;

means for decrypting the encrypted at least one authentication sequence using the second network identifier as a decryption key; and means for executing an expedited login task to access the application with the at least one authentication sequence if the decryption of the at least one authentication sequence is successful.

18. The system of clam 17, further comprising means for deleting the encrypted at least one authentication sequence from the memory upon a failure to successfully decrypt the encrypted at least one authentication sequence using the second network identifier as a decryption key.

19. The system of claim 17, wherein the expedited login task to access the application with the at least one authentication sequence further comprises means for performing an automated login to access the application using the at least one authentication sequence.

20. The system of claim 17, wherein the expedited login task to access the application with the at least one authentication sequence further comprises:
    means for presenting an application login interface to a user with the at least one application sequence inserted in the application login interface; and
    means for executing the application in the computer system upon a generation of an input associated with the application login interface.

* * * * *

UNITED STATES PATENT AND TRADEMARK OFFICE
CERTIFICATE OF CORRECTION

PATENT NO. : 7,281,130 B2  Page 1 of 1
APPLICATION NO. : 10/630997
DATED : October 9, 2007
INVENTOR(S) : Bruce L. Johnson et al.

It is certified that error appears in the above-identified patent and that said Letters Patent is hereby corrected as shown below:

In column 11, line 14, in Claim 1, delete "produced" and insert -- procured --, therefor.

In column 12, line 20, in Claim 7, delete "netwrok" and insert -- network --, therefor.

In column 12, line 21, in Claim 7, after "stores" insert -- the --.

In column 12, line 25, in Claim 7, delete "at lest" and insert -- at least --, therefor.

In column 13, line 3, in Claim 11, after "stores" delete "that" and insert -- the --, therefor.

In column 13, line 11, in Claim 11, delete "at leas tone" and insert -- at least one --, therefor.

In column 13, line 33, in Claim 12, after "executes" insert -- an expedited --.

In column 13, line 49, in Claim 13, after "comprising" delete ";" and insert -- : --, therefor.

In column 13, line 58, in Claim 13, delete "the" and insert -- that --, therefor.

In column 14, line 58, in Claim 18, delete "clam" and insert -- claim --, therefor.

In column 15, line 5, in Claim 20, delete "application" and insert -- authentication --, therefor.

Signed and Sealed this

Twenty-fourth Day of June, 2008

JON W. DUDAS
*Director of the United States Patent and Trademark Office*